United States Patent [19]

Smith

[11] Patent Number: 5,363,386
[45] Date of Patent: Nov. 8, 1994

[54] OPTICAL WAVEGUIDE LASER

[75] Inventor: Kevin Smith, Woodbridge, England

[73] Assignee: British Telecommunications public limited company, London, England

[21] Appl. No.: 946,464

[22] PCT Filed: May 2, 1991

[86] PCT No.: PCT/GB91/00703

§ 371 Date: Nov. 18, 1992

§ 102(e) Date: Nov. 18, 1992

[87] PCT Pub. No.: WO91/17593

PCT Pub. Date: Nov. 14, 1991

[30] Foreign Application Priority Data

May 2, 1990 [GB] United Kingdom .............. 9009896.8
Nov. 15, 1990 [GB] United Kingdom .............. 9024899.8

[51] Int. Cl.$^5$ ............................................... H01S 3/30
[52] U.S. Cl. ............................................ 372/6; 372/18; 372/39; 372/102; 372/64
[58] Field of Search .................. 372/6, 18, 25, 39, 64, 372/105, 102

[56] References Cited

U.S. PATENT DOCUMENTS

| | | | |
|---|---|---|---|
| 4,635,263 | 1/1987 | Mollenauer | 372/18 |
| 4,685,107 | 8/1987 | Kafka et al. | 372/6 |
| 4,835,778 | 5/1989 | Kafka et al. | 372/6 |
| 5,008,887 | 4/1991 | Kafka et al. | 372/18 |

OTHER PUBLICATIONS

Smith et al., "Erbium Fibre Soliton Laser"; Electronics Letters, 19 Jul. 1990, vol. 26, No. 15.

*Primary Examiner*—Leon Scott, Jr.
*Attorney, Agent, or Firm*—Nixon & Vanderhye

[57] ABSTRACT

A laser includes a soliton supporting waveguide of $SiO_2$—$Al_2O_3$—$P_2O_5$ with an erbium doping level of 1100 ppm, the fibre having a core radius of 2.5 μm and a core-cladding refractive index difference of 0.015 operated such that the solitons propagating in the waveguide have a soliton period greater than the amplification period of the laser.

19 Claims, 7 Drawing Sheets

OPTICAL WAVEGUIDE LASER

BACKGROUND OF THE INVENTION

1. Field of the Invention

This invention relates to optical waveguide lasers and in particular to soliton lasers.

2. Related Art

Ultra-fast light pulse sources will be key components in future high bit rate telecommunications systems and soliton pulse sources in particular are recognised as being valuable for long distance high bit rate systems. A current requirement is for the generation of solitons with picosecond optical pulses and sufficient peak powers for soliton propagation in the 1.55 µm silica optical fibre transmission window.

Although soliton pulses are robust to quite large effects of both chirp and phase noise, the evolution of such pulses inevitably involves the shedding of radiation, leaving behind a less energetic soliton superposed on a continually spreading background component. This dispersive radiation can give rise to interaction between soliton bits and thereby limit the information capacity of the system. The ideal soliton source, therefore, is one providing picosecond duration pulses with temporal, spectral and power characteristics compatible with those of fundamental soliton pulses in the transmission fibre.

One method of generating picosecond pulses is discussed in an article entitled "Mode-locked erbium-doped fibre laser with soliton pulse shaping" by J. D. Kafka, T. Baer and D. W. Hall, Optics Letters 14, No. 22 (November 1989) pp 1269–1271. A mode-locked erbium doped fibre laser is in the form of a ring laser incorporating a 70 m long erbium-doped fibre as the gain fibre, an integrated modulator and a 2 km length of telecommunications fibre. The telecommunications fibre provides a degree of soliton pulse shaping to the pulse produced by the laser.

BRIEF SUMMARY OF THE INVENTION

According to the present invention a laser including a soliton supporting waveguide doped with a material capable of providing optical gain is operated such that the solitons propagating in the waveguide have a soliton period greater than the amplification period of the laser.

The pulse energy in the pulse has to be sufficient to allow the pulse to cancel out the effects of anomolous group delay dispersion (which may be positive or negative) through the non-linearity of the waveguide, i.e. the change in refractive index of the waveguide with optical intensity. This is the basic mechanism of soliton formation.

The applicants have determined that even through the pulses may undergo large excursions in peak power, in a laser with mirrors of reflectivity of 100% and 4%, for example, there is a stable solution of a soliton nature when the laser is operated according to the present invention.

Preferably the laser is operated such that there are at most five pulses propagating in the laser at any given time and with a pulse repetition rate such that the pulses are fundamentally mode locked.

The value of the pulse energy, which can be adjusted for a given optical waveguide laser by adjusting the pump power, is not critical. As will be discussed later a low level pedestal component is introduced if the energy is too high.

The laser is preferably arranged as a ring laser. Conveniently, the laser is a mode-locked laser to form initial pulses which then become true soliton pulses. The method of seeding the pulses is not an essential element of the present invention so other methods, including self seeding may be used.

The invention is applicable generally to optical waveguides, where by "optical" is meant that part of the electromagnetic spectrum which is generally known as the visible region together with those parts of the infrared and ultraviolet regions at each end of the visible region which are capable of being transmitted by dielectric optical waveguides such as optical fibres.

The invention is of particular application to long distance optical communications systems which generally use the 1.5 µm transmission window of silica optical fibres. Preferably, therefore, the optical waveguide comprises an erbium doped optical fibre which has a highly efficient operation over the 1.52 µm to 1.58 µm wavelength range and is readily coupled to an optical fibre network.

It will be appreciated that other host and dopants may be employed for use within different transmission windows of other networks or for the generation of soliton pulses for laboratory experiments.

Semiconductor diode pumping of the erbium fibre laser at 1480 nm or 980 nm may be a possibility along with pumping by a diode pumped frequency doubled YAG laser.

BRIEF DESCRIPTION OF THE DRAWING

An embodiment of the present invention will now be described by way of example only with reference to the accompanying drawings of which

DETAILED DESCRIPTION OF EXEMPLARY EMBODIMENTS

Figure 1:
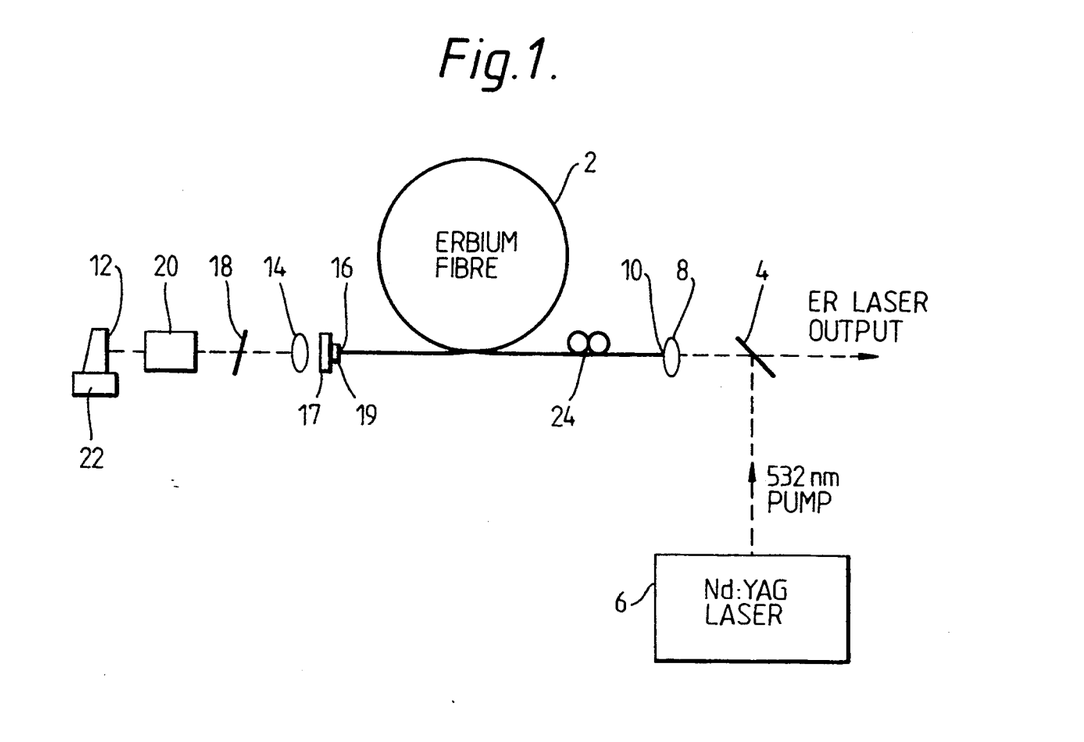
FIG. 1 is a schematic diagram of an erbium fibre soliton laser according to the present invention.

Referring to FIG. 1 a soliton laser comprises a 10 m length of $SiO_2$—$Al_2O_3$—$P_2O_5$ optical fibre host 2 with an $Er^{3+}$ doping level of 1100 ppm having a core radius of 2.5 µm and a core-cladding refractive index difference of 0.015. A dichroic beamsplitter 4 permits efficient coupling of pump radiation at 532 nm from the frequency doubled output of a mode-locked cw Nd:YAG laser 6 via an uncoated microscope objective 8 adjacent an end 10 of the fibre 2 and high (~90%) throughput of 1.55 μm erbium laser output.

The end 10 of the fibre 2 was polished to form an approximately 4% output reflector while a nominally 100% reflecting mirror 12 completed the laser resonator.

A further microscope objective 14 adjacent an end 16 of the fibre 2, optimised for transmission at 1.55 μm, was used to collimate and direct light exiting the fibre at the end 16 to a 1 mm thick silicon filter 18 and a lithium niobate mode-locker 20 positioned close to the mirror 12. The filter 18 blocks residual pump light to prevent photorefractive damage to the mode-locker 20.

The mirror 12 could be replaced with a grating to provide a bandwidth restriction an/r tunability. Reflections from the end 16 of the fibre 2 were effectively suppressed by making it a polished, 5° angle face. Further suppression was achieved by placing a silica block 17 close to the fibre end 16 with a blob of index-matching gel 19 bridging the block-fibre interface. Fine adjustment of the laser cavity length was accomplished by mounting the mirror 12 on a precision translation stage 22.

The mode-locker 20 comprised a Brewster angled 3×3×10 mm lithium niobate slab mounted within a resonant LC circuit tuned to 420 MHz and used to mode-lock the laser by the phase modulation scheme discussed in the text book "LASERS" by A. E. Siegman University Science Books ISBN 0-935-7 02-11-5 which has been employed with $Nd^{3+}$ fibre laser to generate pulses as short as 20 ps.

Fibre polarisation controllers 24 were included in order to optimise the polarisation of the light incident on the modulator.

The output pulse durations of the mode-locked laser were recorded using the standard non-collinear, second harmonic auto-correlation technique. Spectral data were recorded using a scanning grating spectrometer (not shown). Output powers were measured with a Scientech 362 power meter and corrected for the known transmission characteristics of the combination of the lens 8 and the beamsplitter 4.

Since the upper state life-time of the $Er^{3+}$ ion is long (9.8 ms), the pump pulse train (~50 ps in duration at a repetition frequency of 76 MHz) is integrated and essentially looks like a CW pump.

Figure 2:
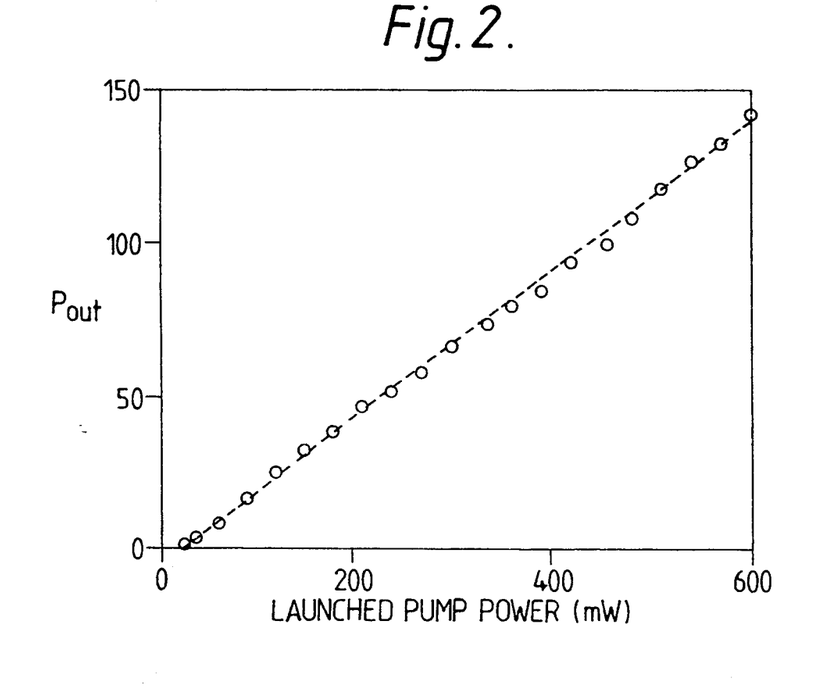
FIGS. 2 and 3 are graphs of the launched pump power and output power of the laser of FIG. 1.
Figure 3:
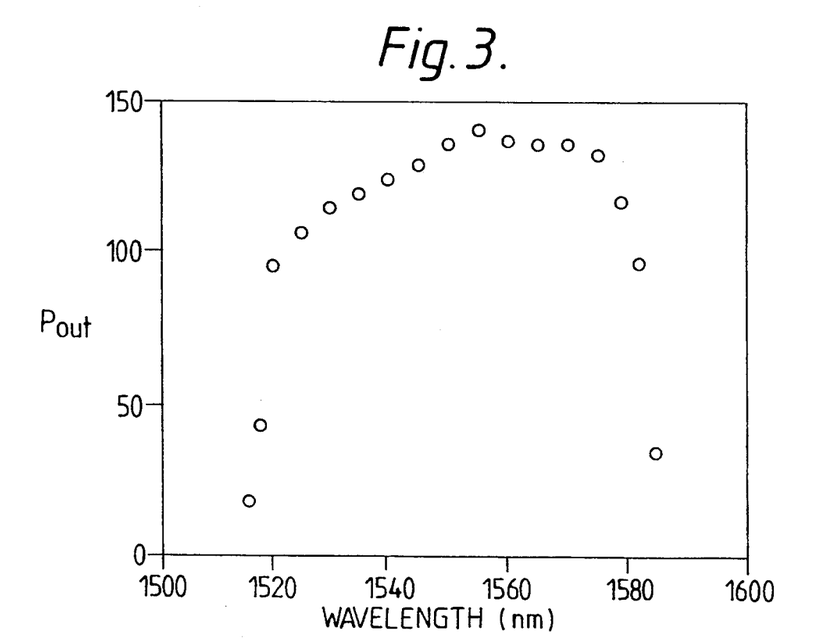

The performance of the 532 nm pumped CW erbium laser is illustrated in graphs of FIGS. 2 and 3. For the experiments in which the data shown in these two graphs were obtained, a 1200 line/mm gold coated grating replaced the mirror 12 and modelocker 20 arrangement of FIG. 1. Powers in excess of 100 mW were available over the 1.52–1.58 μm range for an estimated launched pump power of 600 mW as shown in FIG. 2. At the peak of the tuning curve, about 1.56 μm, an output of about 140 mW was obtained as shown in FIG. 3. Assuming a 70% reflectivity for the grating, the maximum expected slope efficiency is about 26%. This is in good agreement with the 24% slope efficiency inferred from FIG. 2 and is a consequence of the low excited state absorption at 532 nm.

Figure 4:
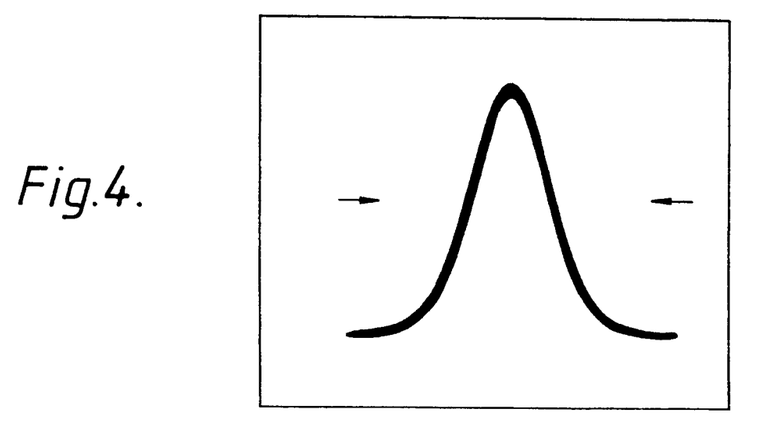
FIGS. 4 to 6 are oscillographs of the autocorrelation traces of the output of the laser of FIG. 1 at different operating conditions.
Figure 5:
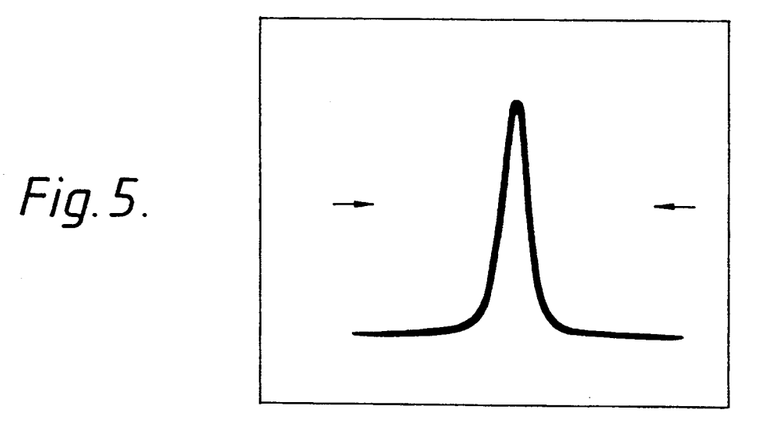
Figure 6:
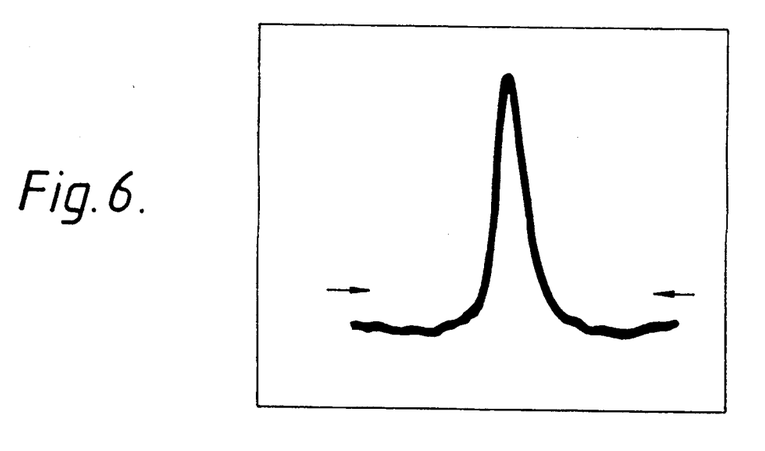

The mode-locked operation of the erbium fibre laser of FIG. 1 is depicted in FIGS. 4 to 6, where there are shown autocorrelation traces of the laser output under various conditions. Since the round-trip erbium fibre length was 20 m, there are ~40 laser pulses in the cavity at any one time. By incorporating suitable bandwidth restricting elements inside the laser resonator, for example a birefringent tuner plate, pulse durations ranging from 40 ps down to 15 ps (assuming a $sech^2$ pulse shape) were produced with time-bandwidth products $\Delta t \Delta \nu$ of 0.5–1.0 respectively. The higher products for the shorter pulses are indicative of the increased role of nonlinear phenomena in the pulse formation process.

FIG. 4 shows an autocorrelation trace of 17.3 ps pulses ($\Delta t \Delta \nu$) obtained with a 0.5 mm thick quartz birefringent tuner plate. Average output powers of the laser were in keeping with the performance depicted in FIG. 2. As expected for phase modulation mode-locking, two sets of 420 MHz pulse trains were observed corresponding to either extremum of the phase modulation. Either set can be selected through etalon tuning (via the filter 18) and fine adjustment of the focus of lens 14. In addition, these adjustments facilitated some control of the laser bandwidth and hence the pulse-width.

When the laser bandwidth restriction was removed, further pulse compression was observed. Low output pulses (less than ~5 W peak) with durations in the 3–5 ps range were recorded with time-bandwidth products of ~0.4. By increasing the pump power, however, pulse durations if 2–3 ps were generated with time-bandwidth products in the range 0.3–0.35.

FIG. 5 shows an autocorrelation of 2.9 ps pulses recorded at an average (peak) power of 8.5 mW (6.9 W). A $sech^2$ pulse shape is an excellent fit to the autocorrelation and is also consistent with the measured $\Delta t \Delta \nu = 0.3$. These pedestal-free pulses clearly have the appropriate temporal and spectral characteristics for fundamental solitons. Previous work on femto-second amplification in erbium fibres with similar dopant levels and core geometries to the above fibre is consistant with a low positive group delay dispersion. If we take $D=5$ ps/nm/km and $A_{eff}=30$ μm$^2$, we calculate a final soliton power $P_1=0.5$ W for a pulse width of 3 ps.

Although this is significantly lower than the measured output, the discrepancy is not surprising when we consider that the laser output corresponds to the peak of the energy changes occurring within the distributed amplification.

At higher output powers, although a significant compression of the pulse-width was observed, a low level pedestal component was clearly evident. FIG. 6 shows the output of the laser at 48 mW average power. From both autocorrelation and spectral measurements, ~53% of the output energy was estimated to be in the pedestal, which implies a peak power of 44 W for the short, 1.2 ps component. It is noteworthy that even in the pedestal region, the autocorrelation and spectral measurements of the short component were still in accordance with a $sech^2$ pulse shape.

Figure 7:
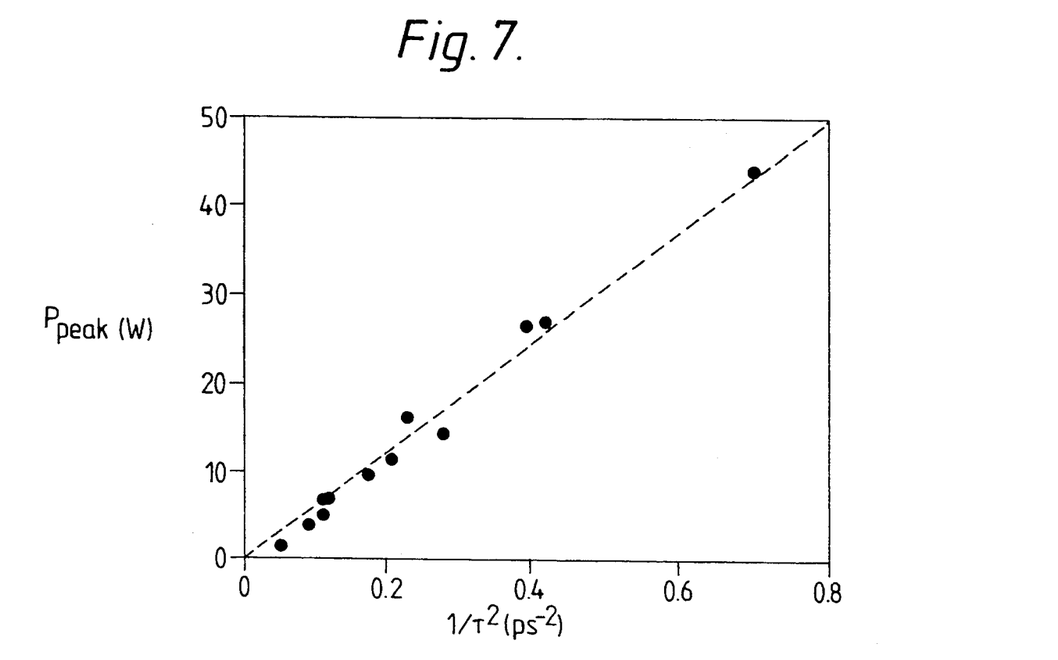
FIG. 7 is a graph of $P_{peak}(W)$ of the short pulse component as a function of $1/t^2(ps^{-2})$.

FIG. 7 is a graph of the data recorded over a range of output powers as the pump power was increased into the pedestal region. It indicated that the peak power of the short component scales in direct proportion to $1/t^2$. These results add further weight to the notion of soliton formation.

It is informative to compare these results to the predictions of the standard Kuizenga and Siegman FM mode-locking model for a homogenously broadened laser medium. For the case of zero frequency detuning, typical values of the saturated round-trip gain coefficient ($G_3 \sim 1.6$), and modulation depth ($\Delta_m \sim 0.1$), lead to a Gaussian pulse width depending primarily on $1/(f_m \Delta f_3)^{\frac{1}{2}}$ where $f_m$ is the modulation frequency and $\Delta f_3$ is the effective gain bandwidth. If we take $f_m=420$ MHz $2^{\frac{1}{2}}$ 0.44 and $\Delta f_3=1$ THz, we therefore expect a chirped ($\Delta t\Delta v=\times 0.44$) pulse with a duration of $\sim 50$ ps. By detuning the drive frequency, the mode-locked pulses can be compressed (to $\sim 35$ ps) and thereby de-chirped such that $\Delta t\Delta v=0.44$. It is clear that the model incorrectly predicts both the pulse shapes and durations observed in our experiments.

We believe that in order to fully explain our observations, the interplay between fibre nonlinearity and dispersion must be invoked. In the case where the group delay dispersion is positive, then soliton-like compression to picosecond duration $sech^2$ pulse shapes would be expected to follow. Indeed, femtosecond pulse amplification in erbium fibre with dopant levels and core geometries similar to our sample, are consistent with a low, positive group delay dispersion ($\lambda_0 \sim 1.5~\mu m$).

In the model presented here, we have numerically solved the Nonlinear Schrodinger Equation (NLSE) with a periodically varying pulse energy. As a crude approximation to the laser configuration, we employed a distributed gain (G$\sim 14$ dB) which exactly cancelled the large lump loss output coupling (96% transmission) for the resonator. An amplification period, L, of 20 m was chosen, i.e. the round-trip fibre length of the resonator. We also take a low, positive group delay dispersion D=5 ps/nm/km, in keeping with the dispersion-shifted properties of the erbium fibre. A simple uniform amplitude gain coefficient, G, is assumed throughout the amplification period such that the pulse energy, $E=E_{in}e^{2GZ}$, where $E_{in}$ is the input energy, and Z is the distance a pulse has propagated along the fibre.

Figure 8:
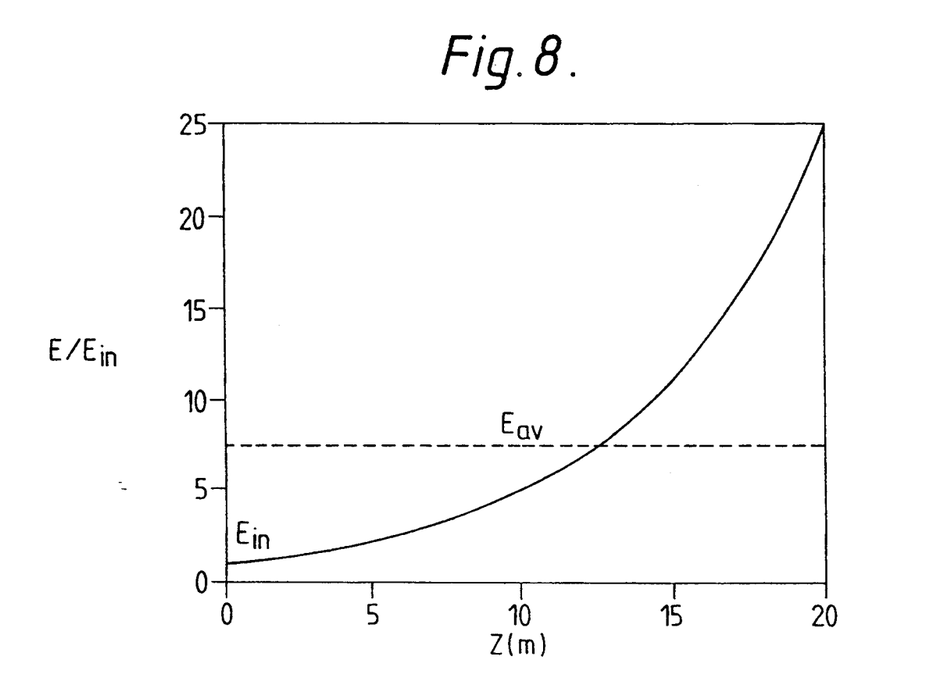
FIG. 8 is a graph of the energy profile of the soliton pulses for an amplification period for 14 dB output coupling normalised to the input energy.

FIG. 8 illustrates the pulse energy profile assumed in the computer simulations. The dashed line represents the average energy, $E_{3v}$. In addition, owing to the long life-time 0.10 ms) and low gain cross-section ($10^{-25}$ cm$^2$) of the erbium ions, the effects of gain saturation during the pulse are neglected. (For picosecond pulses the calculated saturation energy is $\sim 20~\mu J$, i.e. six orders of magnitude greater than the typical output pulse energies).

The key result of the numerical simulations is as follows: Stable fundamental soliton propagation is achieved in the limit of a "long" soliton period (i.e. $Z_0>>L$) when the average energy in the amplification period, $E_{av}$, is set equal to that of the fundamental soliton energy, $E_1$. The input pulse energy is therefore set by the following equation $$E_{in}=E_1.2GL/(e^{2GL}-1) \quad (1)$$

For example, in the $\sim 14$ dB loss case, (i.e. $\exp^{2GL}=25$), then $E_{in}=0.134E_1$.

Figure 9:
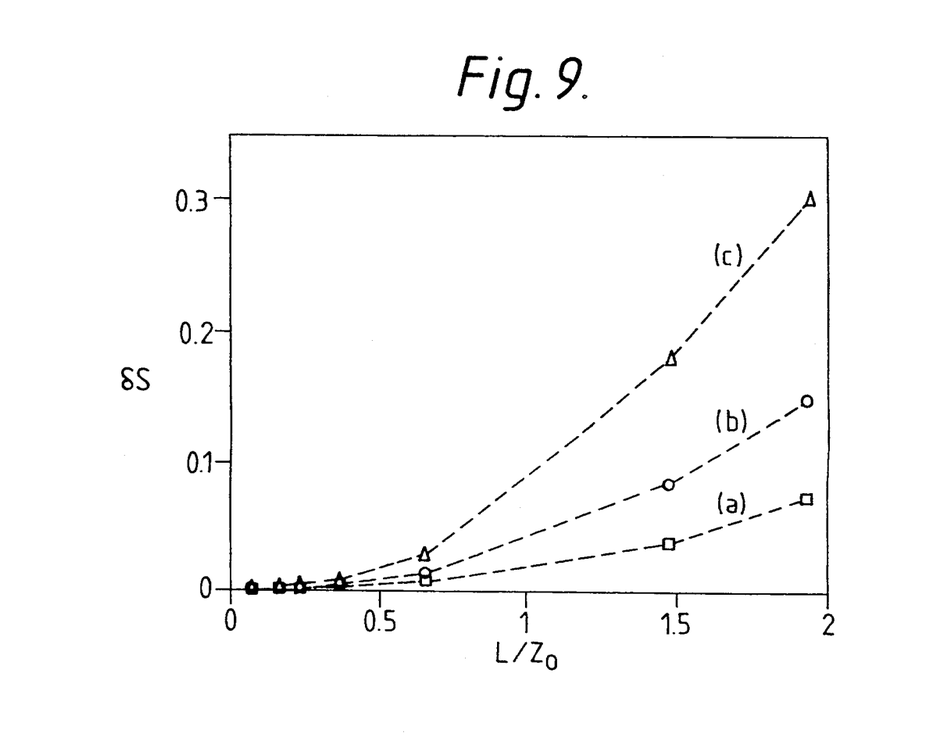
FIG. 9 is a graph of the change in pulse area, $\delta S$, for an $N=1$ soliton after a single amplification period as a function of $L/Z_0$ for (a) 3 dB, (b) 6 dB and (c) 14 dB output coupling.
Figure 10A:
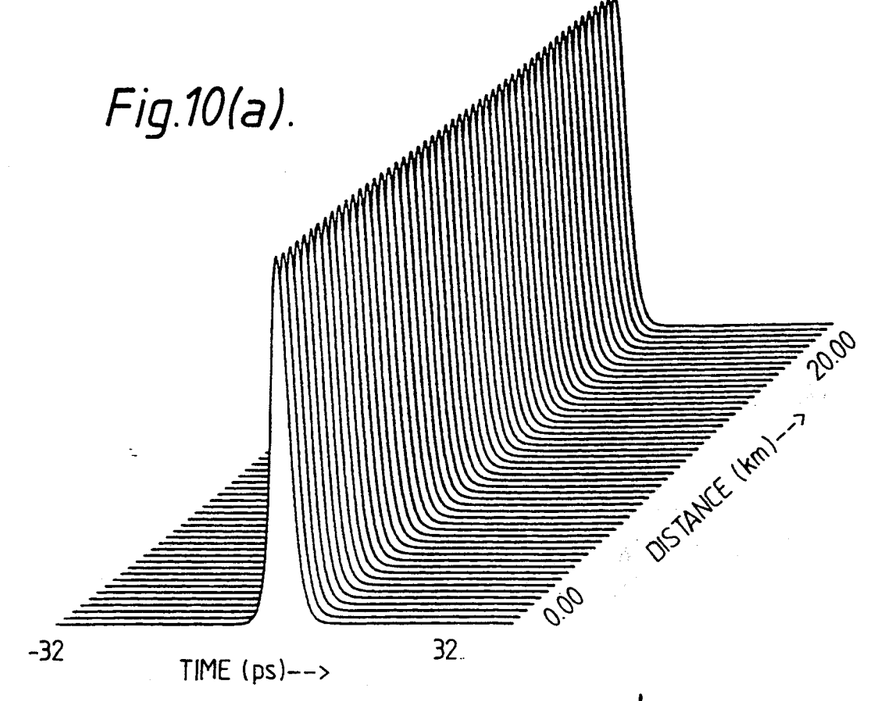
FIGS. 10(a) and 10(b) are graphs of the results of a numerical simulation for $L/Z_0=0.026$ propagating over a distance of 20 km (1000 amplification periods) and $L/Z_0=1.93$ over 1 km respectively.
Figure 10B:
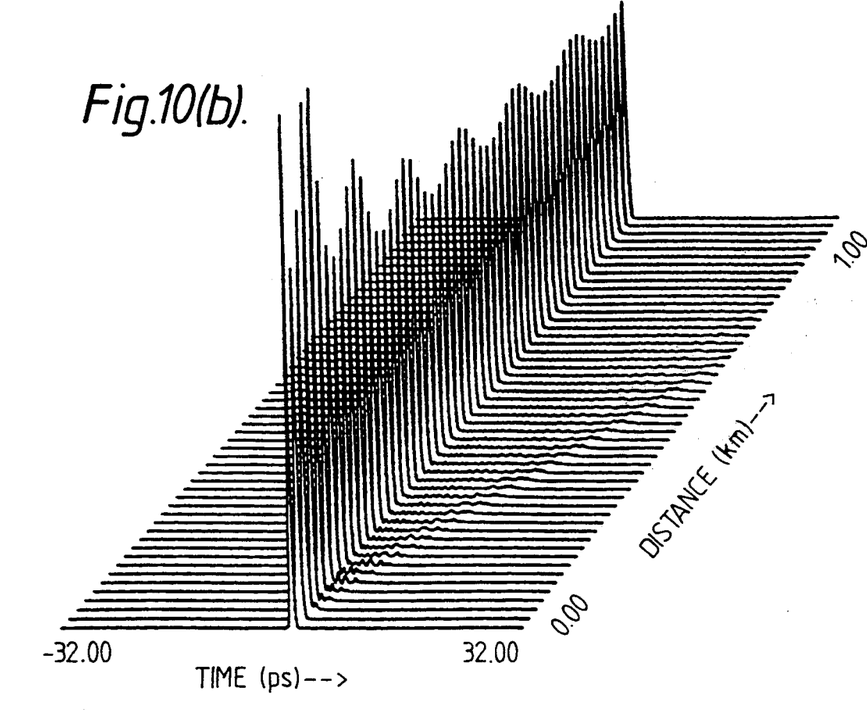

FIGS. 9, 10(a) and 10(b) illustrate the essential results of the simulations. FIG. 9 shows the changes in pulse area, L S (normalised to unity), for the fundamental soliton (with $E_{in}$ calculated as above) as a function of $L/Z_0$ after a single amplification period. The pulse area (defined as the time integral of the absolute value of the pulse amplitude) is commonly utilised as a sensitive indication of the distortion from a true soliton. Clearly, in the "long" $Z_0$ limit, the computed pulse distortions are negligible. This is also apparent in FIG. 10(a), where a simulation over a total distance of 20 km ($\sim 26$ soliton periods) is depicted for $L/Z_0=0.026$ and 14 dB output loss ($t \sim 3$ ps). In FIG. 9 we also show the computed pulse distortions for 3 dB and 6 dB output losses. As expected, by reducing the magnitude of the energy deviations (and thereby approaching the ideal lossless limit) pulse distortions can be significantly reduced.

It is important to note that operation in the long soliton limit is preferred but that the operation regime of the present invention extends to $Z_0>L$ as discussed below. It is informative to calculate the soliton parameters associated with pulses generated by the laser. For a 3 ps pulse, a dispersion of 5 ps/nm/km and an effective area, $A_{eff}=30~\mu m^2$, we obtain $Z_0=705$ m and a fundamental soliton power, $P_1\sim 0.5$ W. Clearly, the long soliton period criterion is easily satisfied with $L/Z_0 \sim 0.03$. The calculated value of $P_1$, however, is significantly less than the measured output power of 5 W. This can be understood in terms of FIG. 8. We must remember that the important soliton parameter is the path average value, $E_{av}$, represented by the dashed line in FIG. 8. In the case of our simplified energy model, the energy at the peak of the profile (96% of which is coupled out) is approximately $3\times E_{av}$. In reality, a more accurate modelling of the energy profile, including, for example, the effects of pump absorption and additional intracavity loss, would be expected to increase the appropriate multiplication factor.

A further characteristic of the laser which can be understood in terms of our model is the $P_{peak}$vs. $1/t^2$ behaviour depicted in FIG. 7. If the pulse area, S is preserved during propagation, then E scales as D/t or equivalently $P_{peak}$ is proportional to $D/t^2$. In the limit $Z_0>>L$, S is well preserved provided that rate of energy modification is "small" i.e., is adiabatic. This is conveniently expressed by the condition $\alpha Z_0>>1$, where $\alpha$ is the average gain coefficient (averaged over the total fibre path). In the laser of FIG. 1, increasing the soliton pulse energy by, say, a factor of 2 over a period of a few seconds (corresponding to a total fibre path length of $\sim 10^6$ km!), translates to an $\alpha \sim 3\times 10^{-5}$ km$^{-1}$. For a typical $Z_0 \sim 0.7$ km (t$\sim 3$ ps), adiabaticity is ensured with $Z_0 \sim 2\times 10^{-5}$. A fundamental limitation to the $1/t^2$ scaling behaviour is the compression of the soliton period ($Z_0$ proportional to $t^2$). Eventually, as the pulse compresses, $Z_0$ becomes comparable to L and the pulse area suffers distortions. A simulation for L/Z=1.93 and 14 dB loss is depicted in FIG. 10(b) and shows the evolution of a soliton pulse together with a spreading radiative component. FIG. 10(b) is a rather extreme case ($\Delta S\sim 0.3$) but serves to illustrate the point that the pulse continually sheds energy and finally evolves to a stable, somewhat broader soliton pulse. It is possible that this mechanism of pulse distortion is the origin of the low-level pedestal observed in the experiments.

The model presented here is very successful in describing the observed characteristics of the erbium soliton laser. This is a consequence of the dominant role of nonlinearity and dispersion in the pulse formation. Our model is not intended to be a complete description and, strictly speaking, should follow pulse evolution form noise. Clearly, a key role of the modulator 20 is to provide a seed modulation upon which the compressive combination of SPM and dispersion can act. Broadly speaking, this evolution must take the form of a high-order soliton compression. In the steady state, although the modulator imposes an immeasureable frequency chirp on the soliton pulses, it is highly likely that the phase modulation plays a major role in shaping the pulse pedestal i.e. in trapping the spreading radiative wave. We have also made no effect to model the more complex gain dynamics involved in the amplification process. In fact, we find that in the long $Z_0$ limit, the soliton pulses are insensitive to the exact details of the energy profile. The simulations presented here assume a constant value for D. We have also modelled a totally integrated soliton laser configuration, where a variety of dispersive components are combined. Here, for $Z_0 >> L$, the relevant dispersion is the average value over the amplification period.

The experimental and theoretical investigations strongly support the idea that the interplay between fibre nonlinearity and dispersion is crucial to pulse formation. Indeed, the temporal, spectral and power characteristics of the laser output are appropriate for fundamental soliton pulses. From our theoretical studies, we find that in the limit $Z_0 > L$, the laser is well described by a simple NLSE model with $E_{av} = E_1$. In particular, the soliton energy, E, was observed to vary in accordance with D/t. This scaling relationship is of particular relevance to proposed applications. For example, in the case of nonlinear all-optical switching, subpicosecond duration pulses may be desirable in order to reduce the average power requirements from the switching source. Since t is proportional to D for a given pulse energy, then low dispersion erbium fibre would be required for the shortest pulses. In addition, in order to minimise the pulse distortions incurred as the pulse compresses, a low loss, short resonator would be advisable (see FIG. 9). On the other hand, for soliton communication systems the requirement is for pulses with durations of some tens of picoseconds. This might be achieved by incorporating a lumped, highly dispersive element, e.g. a grating, in the cavity. In terms of our model, in the long $Z_0$ limit, the soliton will adopt the average value of the cavity dispersion. Also, in order to eliminate pulse chirp a pure AM modulation scheme would be appropriate to initiate the mode-locking process.

Figure 11:
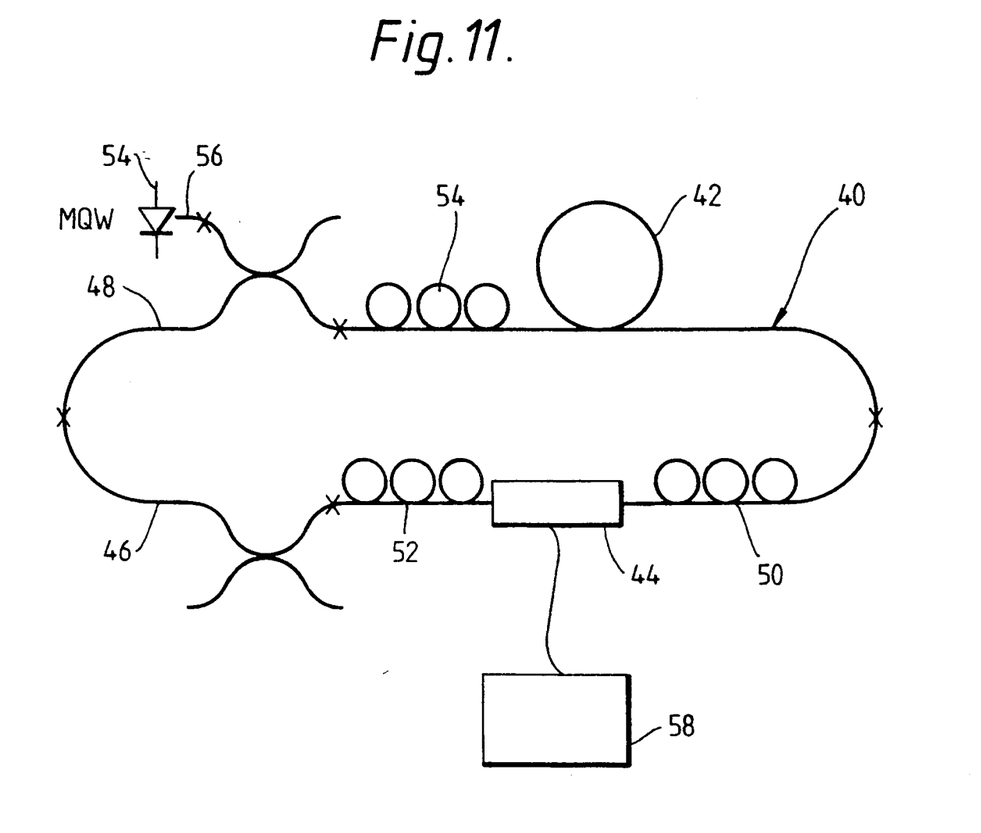
FIG. 11 is a schematic drawing of a fibre ring laser embodying the present invention.

FIG. 11 shows a ring laser incorporating a 13 m long $Al_2O_3$—$GeO_2$—$SiO_2$ host fibre 42 with an erbium doping level of 200–300 ppm, a core radius of 2.5 μm and an index difference of 0.01. The laser 40 also includes an integrated optic lithium niobate phase modulator 44 and optical fibre couplers 46 and 48 fusion spliced together at the points marked "X".

Fibre polarization controllers 50, 52 and 54 were incorporated into the FIG. 11 ring laser order to ensure correct polarization of the light incident on the phase modulator 44.

The phase modulator 44 has a 3 GHz electrical bandwidth, an insertion loss of about 6 dB and a switching voltage of about 10 V. Gigahertz modulation bandwidths together with low modulation voltages required for about phase change make these devices potentially very attractive for the mode locking of integrated fibre lasers.

Unlike the linear cavity laser described previously with reference to FIG. 1 where the mode-locker must be located close to an end mirror, in a ring laser there is no equivalent constraint on the position of the modulation. The choice of a ring configuration of FIG. 11 therefore greatly facilitates the use of high speed, pigtail lithium niobate technology. A packaged/pigtailed GRINSCH (GRaded Index Separate Confinement Hetrostructure) InGaAsP MQW semiconductor laser 55 with output pigtail 56 provides the pump source for the ring laser 40. The threshold current for the 1000 μm-long laser 55 was ~25 mA. Its power output increased linearly with current and at 450 mA output 36 mW with a spectral width (FWHM) of some 7 nm centred around 1.473 μm. The fibre pigtail 56 from the MQW device 55 is spliced to fibre coupler 48 which permits efficient coupling of the pump light into the erbium fibre 42. At the same time optical coupler 46 allowed the erbium emission to be coupled straight through to the coupler 48 which provided a 3 dB output coupling for the cavity.

In spite of the high cavity losses, laser action was achieved at a pump power of only ~15 mW at the input to the coupler 48. This threshold power was estimated from the 200 mA current typically applied to the MQW device 55. There are two counter-propagating light beams in the ring laser 40 and, therefore, two possible outputs from the 3 dB coupler 46. As the drive current to the laser, 55 was increased, the CW output power of both these outputs increased linearly. For the counter-clockwise beam a CW output of ~2 mW was typically recorded at a current of 450 mA. The clockwise direction output beam was significantly lower in power (by ~6 dB) due to traversing the modulator immediately prior to output coupling.

Mode-locked operation was achieved by simply tuning the drive frequency of the modulator 44 to a high harmonic of the fundamental cavity frequency. We employed the amplified sinusoidal output (5–10 $V_{rms}$) of a frequency synthesiser 58. The drive frequencies were restricted to <1 GHz by the synthesiser/amplifier combination for the results reported below. Since the total length of the fibre cavity was ~13 m we infer that ~60 pulses were in the cavity at any one time. Typically, pedestal-free pulses were obtained with durations ~3 ps and average peak powers (counter-clockwise output) in the range 0.5–1.2 mW (0.2–0.5 W). In this ring configuration, the standard telecommunications fibre associated with the couplers 46 and 48 and the pigtails of the modulator 44 is not essential for the soliton shaping and could, in fact be totally non-soliton supporting because the erbium-doped waveguide providing the gain for the laser 40 is chosen to provide the total positive group delay dispersion to ensure soliton pulse generation.

Figure 12A:
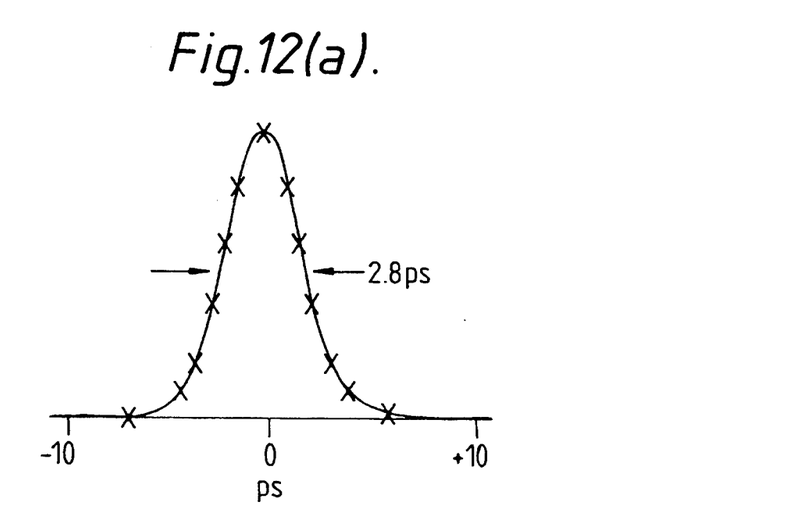
FIGS. 12(a) and 12(b) are graphs of autocorrelation traces of outputs of the laser of FIG. 11.
Figure 12B:
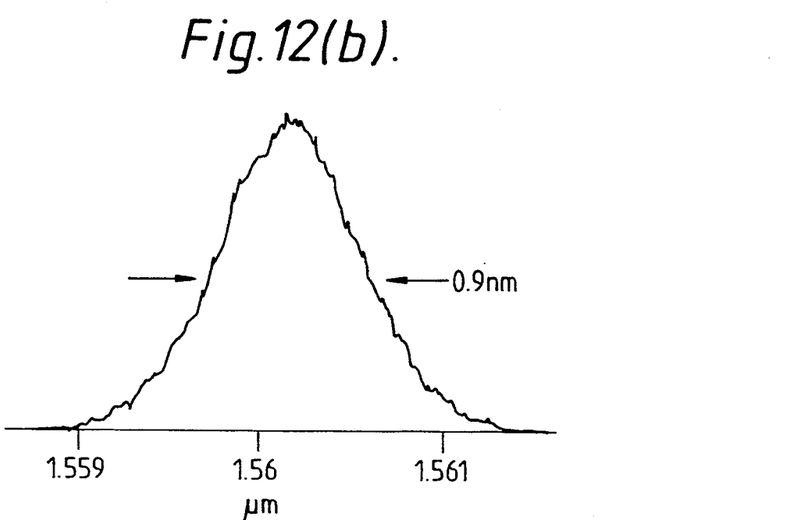

FIG. 12(a) shows an autocorrelation trace of the output of the ring laser 40 recorded at an average power of 0.6 mW and a repetition frequency of 810.6 MHz. An autocorrelation function of a 2.8 ps (FWHM) $sech^2$ intensity is an excellent fit to the experimental data as is clearly shown by theoretical points depicted. The corresponding spectrum is shown in FIG. 12(b) from which a spectral width (FWHM) of 0.9 nm is measured. The time-bandwidth product ($\Delta t \Delta \nu$) of 0.31 is also in excellent agreement with a $sech^2$ pulse shape.

The powers measured above are consistent with the values expected for fundamental soliton pulses. We note that in the "long" soliton period ($Z_0$) regime (i.e. $Z_0 >> L$) or the relevant soliton quantities (e.g. energy and dispersion) are simple averages over the amplification period. For the 13 m length of erbium fibre 42, a low, positive group delay dispersion is expected. In addition, the ring configuration contains approximately 2 m of standard telecommunications fibre associated with the couplers 46, 48 and the pigtailed modulator 44. If we take, for example, dispersion parameters D= +2 and +15 ps/nm/km for the erbium fibre and standard fibre respectively, the average dispersion can be calculated to be ~3.7 ps/nm/km. For a 3 ps pulse, we calculate the soliton period, $Z_0 = 950$ m which easily satisfied the $Z_0 >> L$ criterion. In addition, we calculate a soliton power, $P_i$ ~0.4 W (assuming $A_{eff} = 30$ μm$^2$). This is in good agreement with the measured output powers of the counter-clockwise beam which in turn is a reasonable estimate of the path average soliton power within the cavity. For the travelling wave modulator 44 used here, the counter-propagating light beams experience equivalent phase modulation depths provided that the drive frequencies are less than ~1 GHz. Although the clockwise output was significantly lower in power, the measured temporal and spectral characteristics were similar to the other arm. This is in keeping with the fact that the path average power for the two directions were essentially equal.

At higher pump powers, a slight compression of the output pulse was observed (to ~2.4 ps) together with a low-level pedestal component (~30 ps FWHM). The corresponding spectral measurements revealed the appearance of a narrow (~0.1 nm FWHM) spike close to the peak of the broad (~1 nm) soliton spectrum. In the configuration of FIG. 11, increasing the pump power did not produce the $P_i$ proportional to $1/t^2$ scaling previously noted with respect to the FIG. 1 embodiment. We attribute this to a restriction of the laser bandwidth by residual etalon effects or birefringence in the lithium niobate phase modulator 44. Consistent with this notion, we observed that for both CW and CW mode-locked operations, the inclusion of the modulator 44 gave rise to a strong wavelength discrimination in the output of the laser 40 which was confined to wavelengths separated by ~0.7 nm.

What is claimed is:

1. A laser including a soliton supporting waveguide doped with a material which when pumped produces optical gain, said waveguide having a soliton period characteristic of said soliton supporting waveguide, said soliton period being greater than an amplification period that is the round-trip fibre length of the laser waveguide which provides optical gain.

2. A laser as in claim 1 in which the laser comprises a mode-locked laser.

3. A laser as in claim 1 or 2 including a bandwidth limiting element connected in an optical cavity of said laser.

4. A laser as in claim 3 in which said bandwidth limiting element comprises a lumped, highly dispersive element.

5. A laser as in claim 4 in which the highly dispersive element comprises a diffraction grating.

6. A laser as in claim 1 or 2 including a tuning filter connected in an optical cavity of said laser.

7. A laser as in claim 2, including means for driving said mode-locked laser at a pulse repetition rate corresponding to a fundamental mode of an optical cavity of said mode-locked laser.

8. A laser as in claim 1 or 2 in which the waveguide comprises an erbium doped silica based optical fibre.

9. A laser as claimed in claim 8 in which the optical fibre comprises $SiO_2$—$Al_2O_3$—$P_2O_5$ with an erbium doping level of 1100 ppm, the fibre having a core radius of 2.5 $\mu$m and a core-cladding refractive index difference of 0.015.

10. A laser as in claim 1 including means providing at most five pulses propagating in the laser at any given time.

11. A method for generating soliton pulses including the steps of generating solitons using a laser including a soliton supporting waveguide doped with a material which when pumped produces optical gain, said waveguide having a soliton period characteristic of said soliton supporting waveguide, said soliton period being greater than an amplification period that is the round-trip fibre length of said laser waveguide which provides optical gain.

12. A method as in claim 11, including the step of mode-locking the laser.

13. A method as in claim 11 or 12 including bandwidth limiting pulse within an optical cavity of said laser.

14. A method as in claim 13, wherein said bandwidth limiting is achieved using a lumped, highly dispersive element.

15. A method as in claim 14, in which the highly dispersive element utilizes a diffraction grating.

16. A method as in claim 11 or 12 including use of a tuning filter within an optical cavity of said laser.

17. A method as in claim 12 including driving said mode-locked laser at a pulse repetition rate corresponding to a fundamental mode of an optical cavity of said mode-locked laser.

18. A method as in claim 11 or 12 in which the waveguide comprises an erbium doped silica based optical fibre.

19. A method as in claim 18 in which the optical fibre comprises $SiO_2$—$Al_2O_3$—$P_2O_5$ with an erbium doping level of 1100 ppm, the fibre having a core radius of 2.5 $\mu$m and a core-cladding refractive index difference of 0.015.

* * * * *